United States Patent
Ishi

(10) Patent No.: US 10,213,849 B2
(45) Date of Patent: *Feb. 26, 2019

(54) CUTTING INSERT, CUTTING TOOL, AND METHOD OF MANUFACTURING A MACHINED PRODUCT

(71) Applicant: KYOCERA Corporation, Kyoto-shi, Kyoto (JP)

(72) Inventor: Hirohisa Ishi, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,523

(22) Filed: Jan. 31, 2018

(65) Prior Publication Data

US 2018/0154464 A1    Jun. 7, 2018

Related U.S. Application Data

(63) Continuation of application No. 14/905,265, filed as application No. PCT/JP2014/068683 on Jul. 14, 2014, now Pat. No. 9,908,184.

(30) Foreign Application Priority Data

Jul. 18, 2013  (JP) .................................. 2013-149578
Oct. 11, 2013  (JP) .................................. 2013-213312

(51) Int. Cl.
*B23C 5/20*    (2006.01)
*B23C 5/06*    (2006.01)

(52) U.S. Cl.
CPC ................ *B23C 5/207* (2013.01); *B23C 5/06* (2013.01); *B23C 2200/0461* (2013.01);
(Continued)

(58) Field of Classification Search
CPC ... B23C 5/202; B23C 5/207; B23C 2200/203; B23C 2200/201; B23C 2200/0461; B23C 2200/126
See application file for complete search history.

(56) References Cited

U.S. PATENT DOCUMENTS 6,669,412 B1 *  12/2003  Hirose .................. B23C 5/2221
                                                               407/113
9,908,184 B2 *  3/2018  Ishi ......................... B23C 5/207
(Continued)

FOREIGN PATENT DOCUMENTS

EP    1601483 B1    5/2010
EP    2489454 A1    8/2012
(Continued)

OTHER PUBLICATIONS

International Search Report of the International Searching Authority issued by the Japanese Patent Office for International Application No. PCT/JP2014/068683.
(Continued)

*Primary Examiner* — Will Fridie, Jr.
(74) *Attorney, Agent, or Firm* — Procopio Cory Hargreaves and Savitch LLP

(57) ABSTRACT

A cutting insert according to an embodiment of the present invention has a cutting edge having a first corner cutting edge, a flat cutting edge, a connecting edge, a major cutting edge, and a second corner cutting edge in the order named. The major cutting edge has an upwardly protruding curvilinear portion, a first straight line portion extending from the curvilinear portion toward the connecting edge, and a second straight line portion extending from the curvilinear portion toward the second corner cutting edge. The flat cutting edge and the major cutting edge have a straight line shape, and the connecting edge has an outwardly protruding curvilinear shape in a top view. The flat cutting edge, the
(Continued)

connecting edge, and the first straight line portion are located on a straight line in a side view.

12 Claims, 15 Drawing Sheets

(52) U.S. Cl.
CPC .. *B23C 2200/126* (2013.01); *B23C 2200/203* (2013.01); *B23C 2200/205* (2013.01); *B23C 2200/208* (2013.01)

(56) References Cited

U.S. PATENT DOCUMENTS

| | | | |
|---|---|---|---|
| 2005/0111925 A1 | 5/2005 | Svenningsson et al. | |
| 2007/0269278 A1* | 11/2007 | Scherbarth | B23C 5/202 407/114 |
| 2012/0093596 A1* | 4/2012 | Ishi | B23C 5/06 407/113 |
| 2012/0189396 A1* | 7/2012 | Xu | B23C 5/06 409/132 |
| 2012/0275868 A1* | 11/2012 | Saito | B23C 5/06 407/42 |
| 2012/0301235 A1* | 11/2012 | Yoshioka | B23C 5/06 407/100 |
| 2012/0308318 A1* | 12/2012 | Burtscher | B23C 5/202 407/114 |
| 2014/0161545 A1* | 6/2014 | Inagaki | B23B 27/1603 407/42 |
| 2014/0212229 A1* | 7/2014 | Diepold | B23C 5/202 407/42 |
| 2017/0157685 A1* | 6/2017 | Mao | B23C 5/2213 |

FOREIGN PATENT DOCUMENTS

| | | |
|---|---|---|
| EP | 2495060 A1 | 9/2012 |
| JP | 2000-141123 A | 5/2000 |
| JP | 2002-178210 A | 6/2002 |
| JP | 2009-202324 A | 9/2009 |
| JP | 2013-6221 A | 1/2013 |
| KR | 10-2012-0123463 A | 11/2012 |
| KR | 10-2012-0134115 A | 12/2012 |
| WO | 2004/080633 A1 | 9/2004 |
| WO | 2011/052340 A1 | 5/2011 |
| WO | 2013/029072 A1 | 3/2013 |

OTHER PUBLICATIONS

Office Action dated Jul. 26, 2016, issued in counterpart Korean application No. 10-2016-7000988.

* cited by examiner

A-A Sectional View

B-B Sectional View

C-C Sectional View

CUTTING INSERT, CUTTING TOOL, AND METHOD OF MANUFACTURING A MACHINED PRODUCT

The present application is a continuation of U.S. application Ser. No. 14/905,265 filed on Jan. 14, 2016 which is a National Phase entry of International Application No. PCT/JP2014/068683, filed on Jul. 14, 2014, which claims the benefit of Japanese Application No. 2013-149578, filed on Jul. 18, 2013 and 2013-213312, filed on Oct. 11, 2013. The contents of the above applications are incorporated by reference herein in their entirety.

TECHNICAL FIELD

The present invention relates to a cutting insert, a cutting tool, and a method of manufacturing a machined product.

BACKGROUND ART

Cutting inserts disclosed in, for example, International Publication No. 2013/029072 (Patent Document 1) and International Publication No. 2004/080633 (Patent Document 2) have conventionally been known as a cutting insert for use in a cutting process of a workpiece. The cutting inserts disclosed in Patent Documents 1 and 2 are used in a milling process, such as a face milling process or an end milling process.

The cutting inserts respectively disclosed in Patent Documents 1 and 2 are provided with a flat cutting edge being parallel to a surface of the workpiece in order that a machining surface, namely, a surface of the workpiece to be machined by a cutting process is made into a smooth finished surface. Although the cutting insert disclosed in Patent Document 1 has the flat cutting edge, a cutting edge angle of a major cutting edge is large. The cutting edge angle is an inclination angle of the cutting edge of the cutting insert being attached to a holder with respect to the machining surface of the workpiece. That is, with the cutting insert disclosed in Patent Document 1, chips to be generated during cutting of the workpiece have a large thickness, and the major cutting edge is subjected to a large cutting resistance. Consequently, heat is apt to stay in the major cutting edge, and then the major cutting edge may fracture. It is therefore necessary to decrease a feed per revolution that is an amount of movement of an edge of a cutting tool per revolution. It is possible to decrease the cutting edge angle and increase the feed per revolution by making the flat cutting edge and the major cutting edge into a continuous straight line shape as in the cutting insert disclosed in Patent Document 2.

FIG. 1 shows a situation where the milling process is carried out using the cutting insert disclosed in Patent Documents 1 and 2. As shown in FIG. 1, the workpiece W is to be machined by rotating a plurality of the cutting inserts 1' along an outer periphery of the holder 101' having the plurality of the cutting inserts 1' attached thereto, while moving the holder 101' in one direction. During the machining, a rotation center axis Y1 of the holder 101' is inclined at an angle θ toward an advance direction L of the holder 101' with respect to a vertical axis Y2 relative to the machining surface of the workpiece W. In order to obtain a satisfactorily machined surface, a front edge A cuts the workpiece W with the holder 101' inclined at the angle θ during the machining of the workpiece W, and a rear edge B needs to be moved away from a finished surface. However, the holder 101' is subjected to a thrust force P applied vertically from the machining surface to the front edge A. The thrust force P exerted on the front edge A can cause the front edge A to move up, and the rear edge B can move down by reaction thereof. Hence, when the thrust force P is large, there is a risk that the rear edge B significantly moves down and contacts with the finished surface.

After the machining surface is machined into a smooth finished surface with less unevenness by using the flat cutting edge, the occurrence of damage to the finished surface by the rear edge B becomes a cause of poor machined products. Particularly, in the cutting insert disclosed in Patent Document 2, there remains a risk that the finished surface is damaged because the cutting edge angle of the major cutting edge being continuous with the flat cutting edge is small and the thrust force is large.

The present invention has been made in view of the above problems, and it is an object of the present invention to provide a cutting insert, a cutting tool, and a method of manufacturing a machined product, all of which make it possible to suppress damage to the finished surface while reducing the risk of fractures in the cutting edge.

SUMMARY OF THE INVENTION

A cutting insert according to an embodiment of the present invention has: an upper surface with a polygonal shape which has a side part, and a first corner part and a second corner part each being adjacent to the side part; a lower surface with a polygonal shape which corresponds to the upper surface; a side surface disposed between the lower surface and the upper surface; a first corner cutting edge that is an intersection of the upper surface and the side surface and is located on the first corner part; a second corner cutting edge that is an intersection of the upper surface and the side surface and is located on the second corner part; a flat cutting edge that is an intersection of the upper surface and the side surface and is disposed on the side part; a major cutting edge that is an intersection of the upper surface and the side surface and is disposed between the second corner cutting edge and the flat cutting edge on the side part; and a connecting edge that is an intersection of the upper surface and the side surface and is disposed between the flat cutting edge and the major cutting edge. The flat cutting edge and the major cutting edge have a straight line shape, and the connecting edge has an outwardly protruding curvilinear shape in a top view. The major cutting edge has an upwardly protruding shape, and comprises an upwardly protruding curvilinear portion, a first straight line portion extending from the curvilinear portion toward the connecting edge, and a second straight line portion extending from the curvilinear portion toward the second corner cutting edge in a side view. The flat cutting edge, the connecting edge, and the first straight line portion are located on a straight line in the side view.

EMBODIMENTS FOR CARRYING OUT THE INVENTION

<Cutting Insert>

Figure 3:
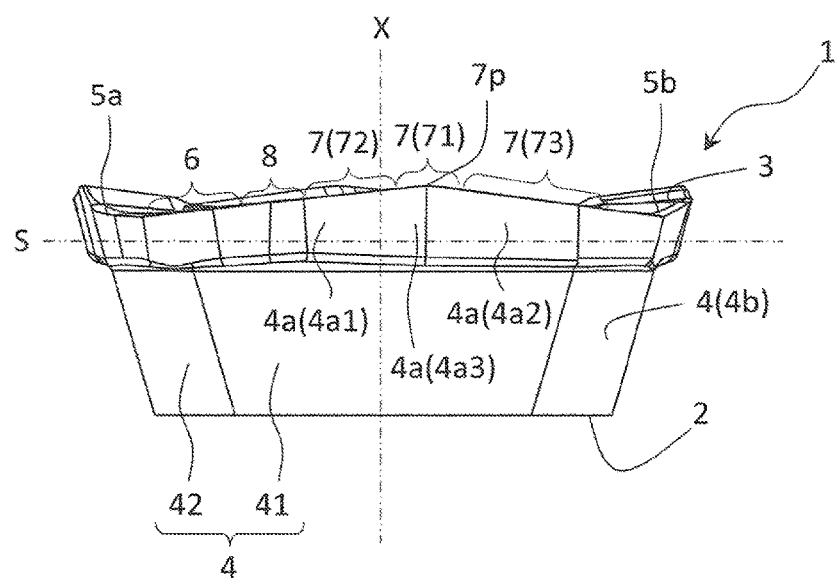
FIG. 3 is a side view of the cutting insert shown in FIG. 2.
Figure 4:
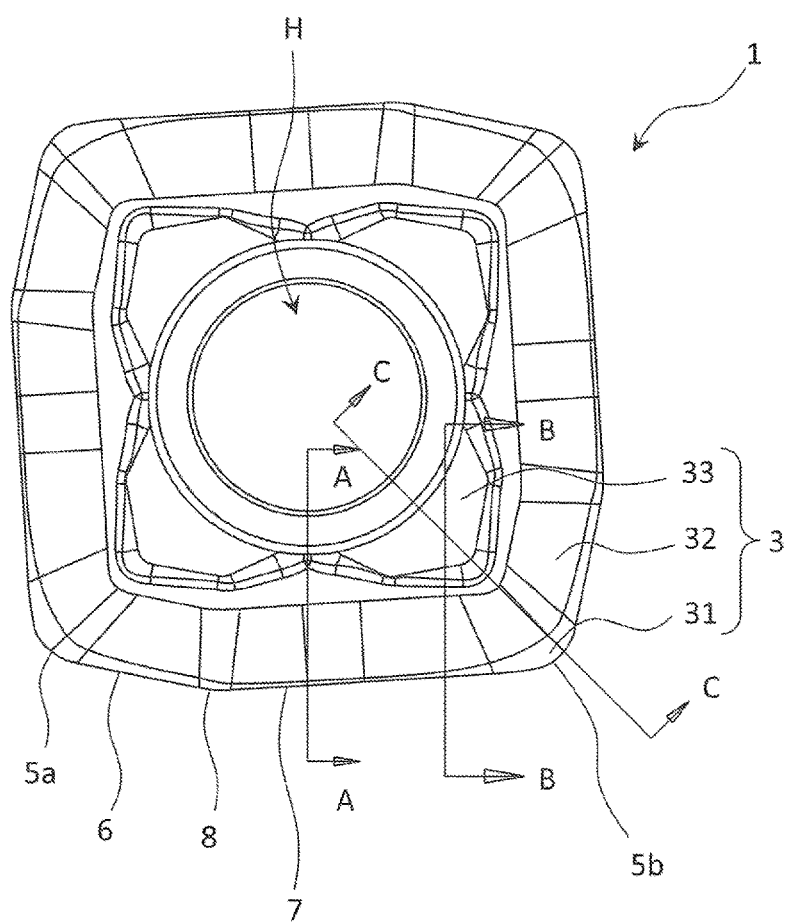
FIG. 4 is a top view of the cutting insert shown in FIG. 2.
Figure 5:
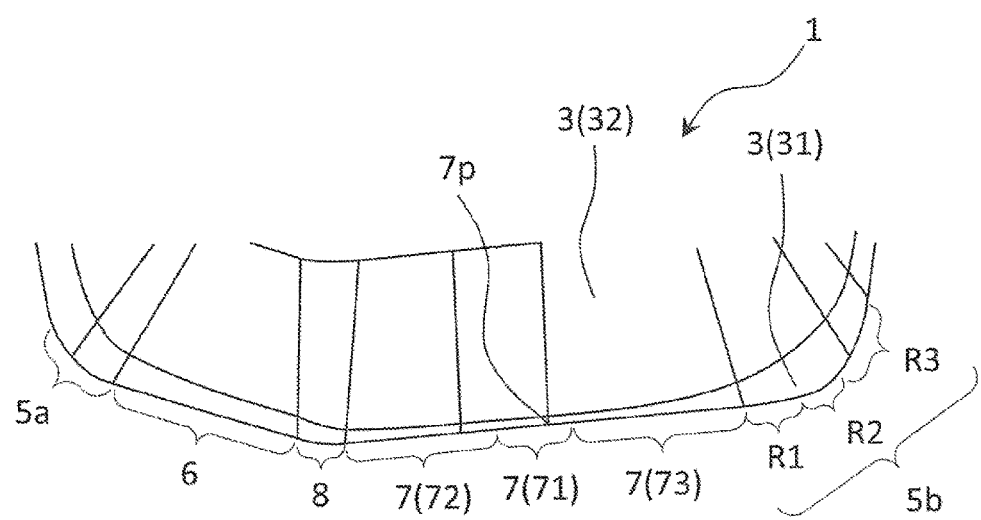
FIG. 5 is a partially enlarged top view of the cutting insert shown in FIG. 4.

A cutting insert 1 (also referred to simply as "insert 1") of an embodiment is described below with reference to FIGS. 2 to 8. A long dashed double-short dashed line in FIG. 2 indicates a center axis X of the insert 1. FIG. 5 is an enlarged top view, partially cut away, of the insert 1 shown in FIG. 4. As shown in FIGS. 2 to 8, the insert 1 of the present embodiment is an indexable insert, and has a lower surface 2, an upper surface 3, a side surface 4 disposed between the lower surface 2 and the upper surface 3, and a cutting edge located along an intersection of the upper surface 3 and the side surface 4. The cutting edge has a first corner cutting edge 5a, a second corner cutting edge 5b, a flat cutting edge 6, a major cutting edge 7, and a connecting edge 8.

The upper surface 3 has a polygonal shape and has a side part, and a first corner part and a second corner part that are adjacent to the side part. The lower surface 2 has a polygonal shape corresponding to that of the upper surface 3. Each of the lower surface 2 and the upper surface 3 of the insert 1 in the present embodiment has a quadrangular shape with a plurality of corner parts. The corner parts in the present embodiment are not corners in the strict sense of the word, but have a curved shape in a top view. The term "top view" denotes a state in which the upper surface 3 of the insert 1 is viewed vertically from above the insert 1.

The first corner cutting edge 5a is an intersection of the upper surface 3 and the side surface 4, and is located on the first corner part. The second corner cutting edge 5b is an intersection of the upper surface 3 and the side surface 4, and is located on the second corner part. The flat cutting edge 6, the major cutting edge 7, and the connecting edge 8 are respectively intersections of the upper surface 3 and the side surface 4, and are located on the side part. The major cutting edge 7 is disposed between the second corner cutting edge 5b and the flat cutting edge 6 on the side part. Therefore, the flat cutting edge 6 is disposed closer to the first corner part than the major cutting edge 7. The major cutting edge 7 is disposed closer to the second corner part than the flat cutting edge 6. The connecting edge 8 is a portion of the cutting edge which connects the flat cutting edge 6 and the major cutting edge 7. Therefore, the connecting edge 8 is disposed between the flat cutting edge 6 and the major cutting edge 7 on the cutting edge.

The flat cutting edge 6 and the major cutting edge 7 have a straight line shape in the top view. The connecting edge 8 located between the flat cutting edge 6 and the major cutting edge 7 has an outwardly protruding curvilinear shape. The major cutting edge 7 has a curvilinear portion 71, a first straight line portion 72, and a second straight line portion 73 in a side view. The term "side view" denotes a state in which the side surface 4 of the insert 1 is viewed horizontally from the side of the insert 1. The curvilinear portion 71 has an upwardly protruding curvilinear shape. The first straight line portion 72 extends from the curvilinear portion 71 toward the connecting edge 8. The second straight line portion 73 extends from the curvilinear portion 71 to the second corner cutting edge 5b. Therefore, the major cutting edge 7 has a generally upwardly protruding shape. Here, the flat cutting edge 6, the connecting edge 8, and the first straight line portion 72 are located on a straight line.

The insert 1 has a through hole H that penetrates vertically. The through hole H extends between a central portion of the upper surface 3 and a central portion of the lower surface 2. The through hole H is a hole that permits insertion of a screw, and is used for fixing the insert 1 to the holder by screwing the screw onto the holder. The through hole H has a circular shape in the top view, and has a diameter of, for example, 2-12 mm.

Thus, the through hole H extends between a center of the upper surface 3 and a center of the lower surface 2, and hence a center axis X of the through hole H extends vertically. A virtual plane S orthogonal to the center axis X is set in the following in order to evaluate positions of components in a vertical direction in the insert 1 of the present embodiment. When the upper surface 3 and the lower surface 2 have the quadrangular shape as in the insert 1 of the present embodiment, an intersection point of diagonals on the upper surface 3 is the center of the upper surface 3, and an intersection point of diagonals on the lower surface 2 is the center of the lower surface 2.

As a material of the cutting insert 1, there is, for example, cemented carbide or cermet. Examples of a composition of cemented carbide include WC—Co manufactured by adding cobalt (Co) powder to tungsten carbide (WC), followed by sintering, WC—TiC—Co manufactured by adding titanium carbide (TiC) to WC—Co, and WC—TiC—TaC—Co manufactured by adding tantalum carbide (TaC) to WC—TiC—Co. The cermet is a sintered composite material obtained by compositing metal with a ceramic ingredient, specifically, a titanium compound composed mainly of titanium carbide (TiC) or titanium nitride (TiN).

A surface of the insert 1 may be coated with a film by chemical vapor deposition (CVD) method or physical vapor deposition (PVD) method. Examples of a composition of the film include titanium carbide (TiC), titanium nitride (TiN), titanium carbonitride (TiCN), and alumina ($Al_2O_3$).

The lower surface 2 or the upper surface 3 of the insert 1 has a maximum width of 5-20 mm. A height from the lower surface 2 to the upper surface 3 is 2-8 mm. The shapes of the upper surface 3 and the lower surface 2 are not limited to the above embodiment. For example, the shape of the upper surface 3 in the top view may be a polygonal shape, such as triangle, pentagon, hexagon, or octagon.

Figure 1:
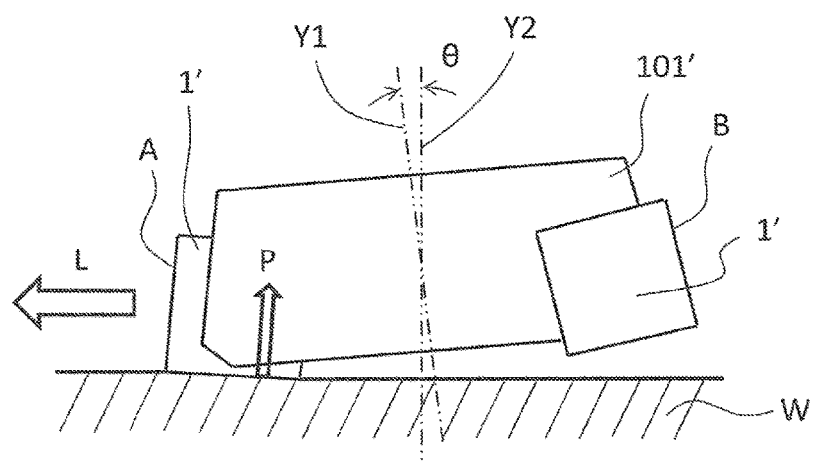
FIG. 1 is a side view schematically showing a state in which a cutting process has been carried out using a conventional cutting insert.
Figure 2:
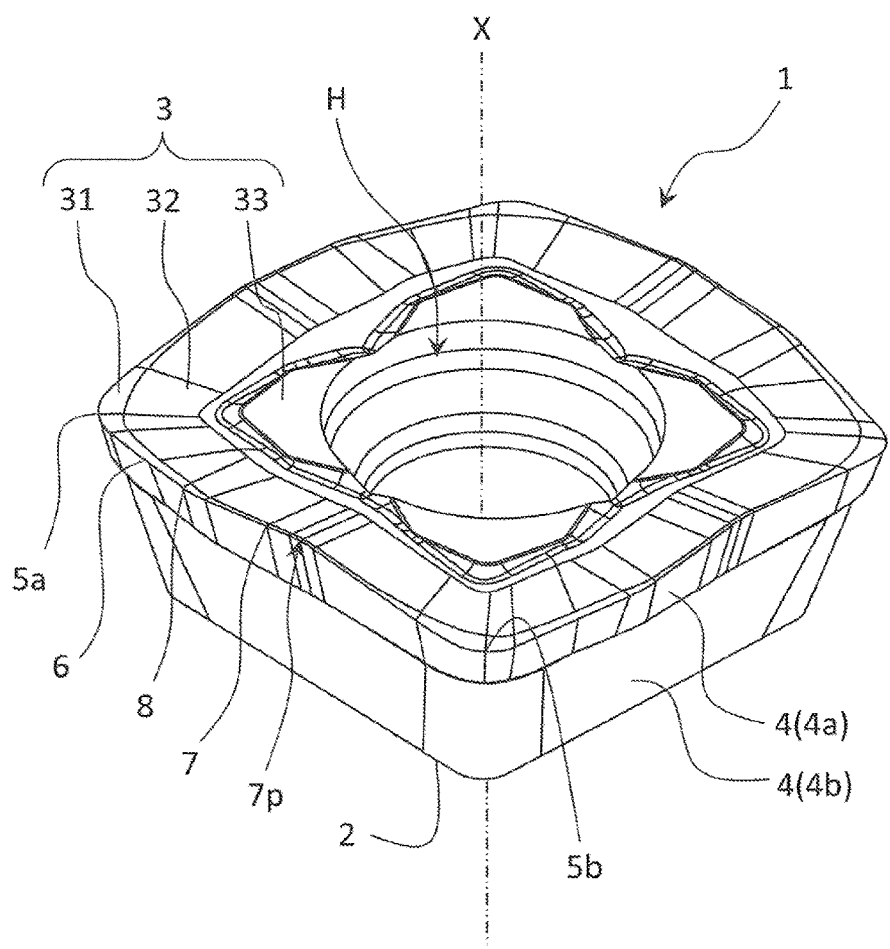
FIG. 2 is a perspective view showing a cutting insert according to an embodiment of the present invention.
Figure 6:
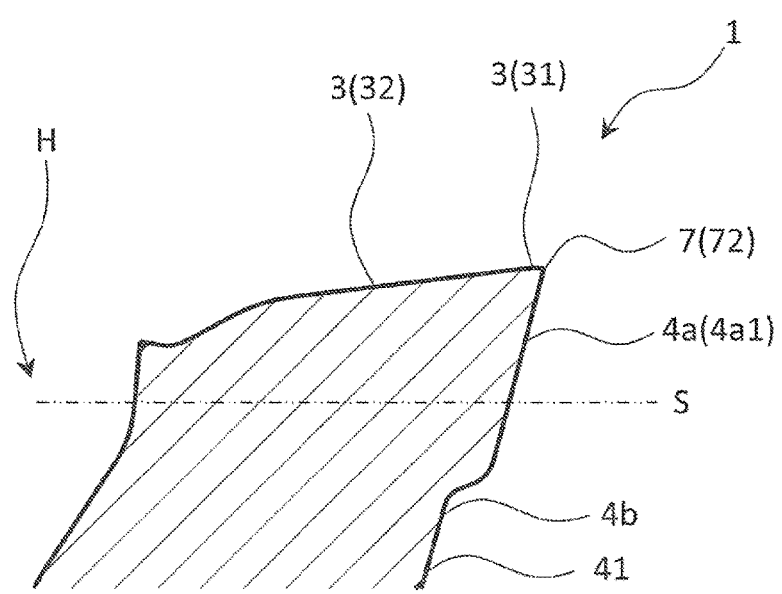
FIG. 6 is a sectional view taken along section line A-A in the cutting insert shown in FIG. 4.
Figure 7:
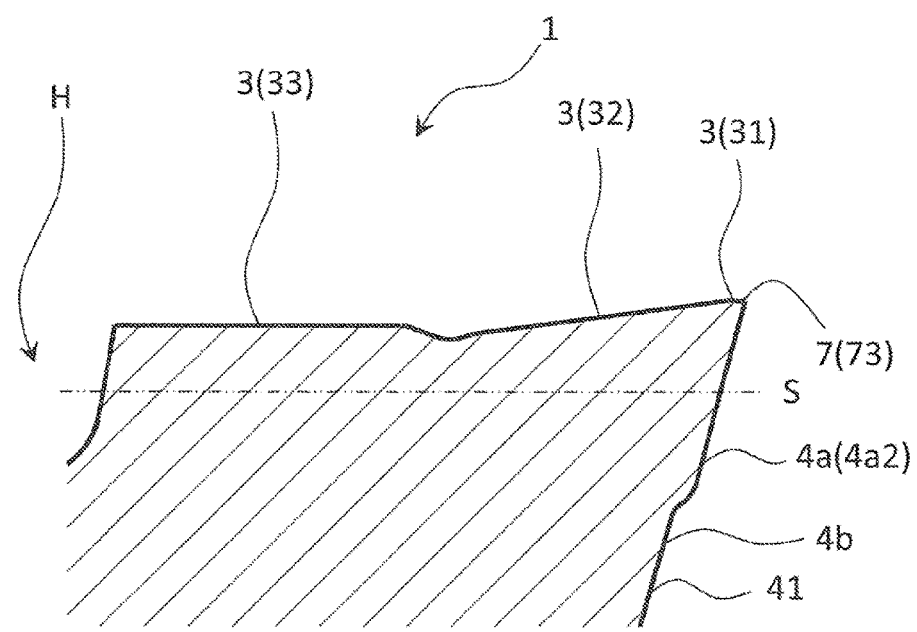
FIG. 7 is a sectional view taken along section line B-B in the cutting insert shown in FIG. 4.
Figure 8:
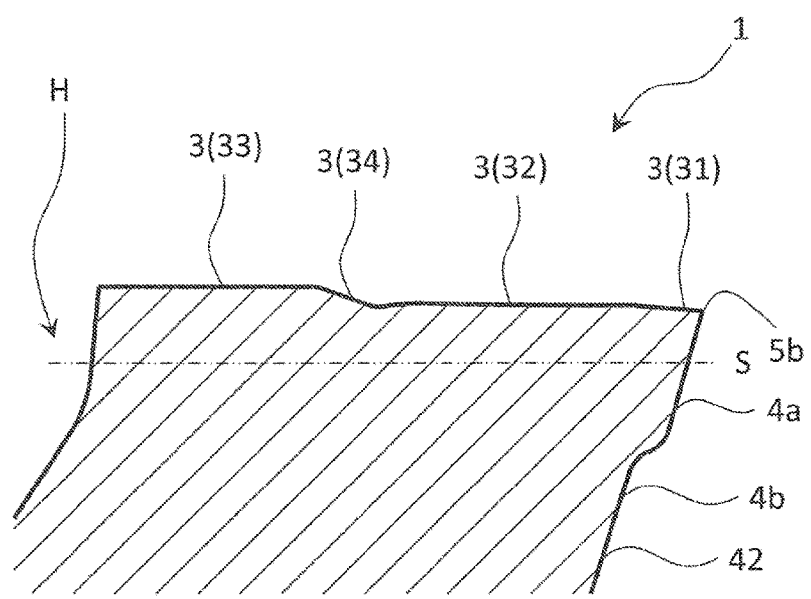
FIG. 8 is a sectional view taken along section line C-C in the cutting insert shown in FIG. 4.

The upper surface 3 has a land surface 31, a rake surface 31, and a flat surface 33 as shown in FIG. 2. The land surface 31 is continuous with a cutting edge corresponding to an outer edge of the upper surface 3. The rake surface 32 is disposed in a region closer to the through hole H than the land surface 31 as shown in FIGS. 6 and 7. The rake surface 32 is an inclined surface, whose height decreases toward the through hole H. The flat surface 33 is disposed in a region closer to the through hole H than the rake surface 32 as shown in FIGS. 7 and 8. The flat surface 33 is a flat surface orthogonal to the center axis X along a penetrating direction of the through hole H. The lower surface 2 in the present embodiment is a flat surface orthogonal to the center axis X.

The land surface 31 is continuous with the cutting edge and is disposed in a region closer to the through hole H than the cutting edge. The land surface 31 is a belt-shaped surface region with a small width disposed along the cutting edge as shown in FIG. 2 or 4. A portion of a region of the land surface 31 of the present embodiment, which is close to the second corner cutting edge 5b, is increased in height toward the center of the upper surface 3 as shown in FIG. 8.

A cutting edge is formed along an intersection of the land surface 31 and the side surface 4. The land surface 31 is disposed to enhance strength of the cutting edge. The rake surface 32 located inside the land surface 31 is an inclined surface, whose height decreases toward the center of the upper surface 3, as shown in FIG. 6. Therefore, an internal angle formed by the rake surface 32 and the side surface 4 is small. However, an internal angle formed by the land surface 31 and the side surface 4 is larger than the internal angle formed by the rake surface 32 and the side surface 4. Accordingly, the land surface 31 contributes to enhancing the strength of the cutting edge. A width of the land surface 31, which is indicated by a distance between the outer edge of the upper surface 3 and an outer edge of the rake surface 32, is suitably set according to cutting conditions, specifically, in a range of 0.05-0.5 mm.

The rake surface 32 is continuous with the land surface 31, and is disposed in a region closer to the center axis X than the land surface 31. The rake surface 32 is a surface, along which chips cut by the major cutting edge 7 graze. Consequently, the chips of a workpiece flow along a surface of the rake surface 32. The rake surface 32 is an inclined surface, whose height decreases toward the center of the upper surface 3 in a region shown in FIG. 6 or 7, in order to achieve satisfactory chip disposal.

Although not particularly shown in the drawings, an inclination angle, which is indicated by an angle formed by the lower surface 2 and the rake surface 32 in a cross section perpendicular to the rake surface 32, may be set in a range of 5°-30°. The rake surface 32 needs to be decreased in height toward the center of the upper surface 3. Therefore, the rake surface 32 may be made up of a plurality of regions having different inclination angles or, alternatively, may have a concave curvilinear shape.

The rake surface 32 has a smaller height than the flat surface 33 between the second corner cutting edge 5b and the through hole H in a region shown in FIG. 8. Hence, chips cut by the major cutting edge are less apt to be caught in a region of the rake surface 32 between the second corner cutting edge 5b and the through hole H. That is, it is less liable to induce chip clogging between the insert 1 and the workpiece, which is caused by the chips being caught in the region. This makes it possible to suppress fractures of the insert 1 due to packed chips.

The flat surface 33 is located further inside the upper surface 3 than the rake surface 32, and is disposed in a region closer to the through hole H than the rake surface 32. The through hole H is disposed in a region closer to the center axis X than the flat surface 33. Owing to the flat surface 33 thus disposed, the insert 1 is fixable to the holder using a retainer (not shown) that is called clamper. Specifically, the clamper and the holder holds therebetween the lower surface 2 and the flat surface 33 of the insert 1, and the insert 1 is fixable between the clamper and the holder.

On this occasion, the flat surface 33 is preferably located lower than the major cutting edge 7 as shown in FIG. 7. Chips are less apt to contact with the flat surface 33 because the flat surface 33 is located lower than the major cutting edge 7. During the time that the major cutting edge 7 is in contact with the workpiece, the flat surface 33 is located further behind in a rotation direction of the holder than the major cutting edge 7. Therefore, chips are less apt to fly off to the flat surface 33, and hence the chips are less apt to attach to the flat surface 33. In the absence of the chips on the flat surface 33, the major cutting edge 7 is smoothly replaceable when replacement of the major cutting edge 7 to be used is carried out by rotating the insert 1 relative to the holder.

The flat surface 33 is located higher than the second corner cutting edge 5b in the region shown in FIG. 8. When the cutting process is carried out using the second corner cutting edge 5b, the flat surface 33 is located higher than the second corner cutting edge 5b. This makes it possible to control so that chips come into contact with an inclined surface 34 connecting the rake surface 32 and the flat surface 33. The inclined surface 34 is disposed at a position that is higher than the rake surface 32 and is lower than the fat surface 33. Consequently, it is possible to suppress the attachment of chips to the flat surface 33.

The side surface 4 is disposed between the lower surface 2 and the upper surface 3. The side surface 4 functions as a flank surface and is connected to the cutting edge on the outer edge of the upper surface 3. A step is formed on the side surface 4 as shown in FIG. 2 or 3. An upper portion 4a of the side surface 4 located higher than the step is connected to the cutting edge in a side view. The upper portion 4a is made into a shape with concave and convex parts conforming with the shape of the cutting edge. A lower portion 4b of the side surface 4 located below the step in the side view has flat portions 41 located below the side part on the upper surface 3, and a curved portion 42 that is located below the corner part including the first corner part and the second corner part on the upper surface 3, and connects different flat portions 41 together. A length of the flat portions 41 along a direction parallel to the lower surface 2 (a right-and-left direction in FIG. 3) in the side view is set in a range of, for example, 5-20 mm, and a length thereof along a direction orthogonal to the lower surface 2 (an up-and-down direction in FIG. 3) in the side view is set in a range of 2-8 mm.

Owing to the flat portions 41 disposed on the side surface 4, a plurality of kinds of cutting inserts are attachable to the holder if the flat portions 41 in the lower portion 4b of the side surface 4 have the same shape, only by suitably changing the shape of the upper portion 4a of the side surface 4 without changing the shape of the holder. Consequently, the workpiece is machinable into a desired shape only by selecting a necessary cutting insert and then attaching it to the holder according to the material or size of the workpiece. That is, it is unnecessary to replace the holder with one corresponding to the cutting insert. This simplifies a method of manufacturing a machine product, thus improving producibility of the machined product.

The insert 1 of the present embodiment has a quadrangular shape and has four side parts and four corner parts in the top view. The two corner parts are adjacent to each other as a pair on each of the side parts. Accordingly, the insert 1 of the present embodiment has four flat cutting edges 6, four major cutting edges 7, and four connecting edges 8. The corner cutting edges are respectively disposed between the major cutting edges 7 along the outer edge of the upper surface 3. Accordingly, the four corner cutting edges, including the first corner cutting edge 5a and the second corner cutting edge 5b, are disposed.

In the insert 1 of the present embodiment, on the basis of one of the four side parts, a pair of corner parts adjacent to the side part is referred to as a first corner part and a second corner part. A corner cutting edge located on the first corner part is referred to as the first corner cutting edge 5a. The corner cutting edge located on the second corner part is referred to as the second corner cutting edge 5b.

Although the four flat cutting edges 6, the four major cutting edges 7, the four connecting edges 8, and the four corner cutting edges are disposed because the insert 1 of the present embodiment has the quadrangular shape in the top view, the insert 1 is not limited thereto. The number of the flat cutting edges 6, the number of the major cutting edges 7, the number of the connecting edges 8, and the number of the corner cutting edges may be three, five, or 6 or more according to the polygonal shape of the insert 1 in the top view.

Figure 9:
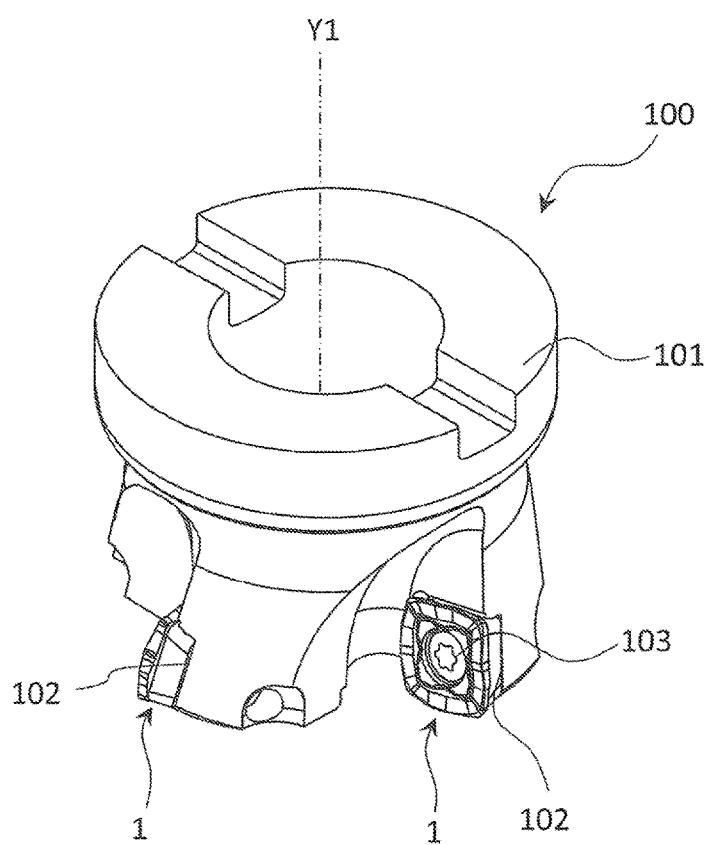
FIG. 9 is a perspective view showing a cutting tool according to an embodiment of the present invention.
Figure 10:
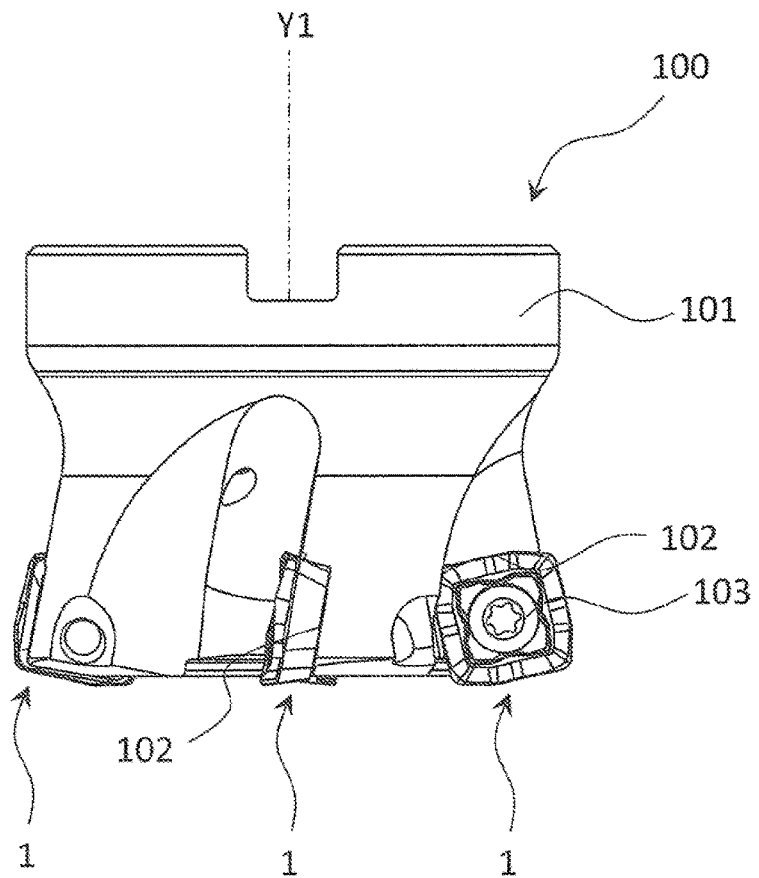
FIG. 10 is a side view showing the cutting tool shown in FIG. 9.

In a cutting tool 100 shown in FIG. 9 or 10, using the insert 1 of the present embodiment, one of the four major cutting edges is used for a cutting process of the workpiece. When the major cutting edge being used is deteriorated due to the cutting process for a long time, the insert 1 may be temporarily removed from the holder 101, and thereafter, the insert 1 may be reattached to the holder 101 by rotating the insert 1 by 90° relative to the center axis X. Thus, any other unused major cutting edge is usable for the cutting process of the workpiece.

Although the intersection of the upper surface 3 and the side surface 4 is not particularly shown in the drawings, the intersection does not have a strict line shape formed by the intersection of two surfaces. The durability of the cutting edge can deteriorate when the intersection of the upper surface 3 and the side surface 4 is sharpened at an acute angle. Therefore, a so-called horning process may be carried out to impart a slight curved surface shape to a region where the upper surface 3 and the side surface 4 intersects with each other.

Each of the flat cutting edges 6 is disposed on the side part of the upper surface 3. Specifically, the flat cutting edge 6 corresponds to the side part between the first corner cutting edge 5a and the second corner cutting edge 5b, and is disposed closer to the first corner cutting edge 5a. As shown in FIG. 5, the flat cutting edge 6 has a straight line shape in the top view. With the insert 1 attached to the holder, the flat cutting edge 6 is approximately parallel to the machining surface of the workpiece and is not inclined even to a finished surface. Therefore, a flat finish is achievable by reducing the concave and convex parts on the finished surface. The term "approximately parallel" includes those being inclined at an angle of 0.5° or less. A length of the flat cutting edge 6 is set in a range of 1-3 mm.

The first corner cutting edge 5a and the second corner cutting edge 5b have an outwardly protruding curvilinear shape and are respectively made up of three regions R1, R2, and R3 having different radii of curvature in the top view as shown in FIG. 5. The radius of curvature in the region R1 is set to 5-50 mm. The radius of curvature in the region R2 is set to 0.5-1 mm. The radius of curvature in the region R3 is set to 1.4-2.5 mm. A dimensional relationship of the radii of curvature in R1 to R3 is established as follows. That is, the radius of curvature in R2 is smaller than the radius of curvature in each of R1 and R3, and the radius of curvature in R3 is smaller than the radius of curvature in R1. Namely, the radii of curvature in R1, R2, and R3 are set to satisfy the following relationship: R2<R3<R1.

A portion of the second corner cutting edge 5b, at which a cutting edge angle with respect to the workpiece changes significantly, is apt to be fractured. The major cutting edges 7 adjacent to each other are gently connectable with a large circular arc by disposing the region of R2 of the second corner cutting edge 5b, which has a small radius of curvature, in the center of the second corner cutting edge 5b. This makes it possible to suppress fractures in the second corner cutting edge 5b in the insert 1 of the present embodiment.

As shown in FIG. 3, the flat cutting edge 6 has a straight line shape and is inclined upward from the first corner cutting edge 5a to the connecting edge 8 in the side view. The flat cutting edge 6 has a smallest vertical height at a portion thereof being connected to the first corner cutting edge 5a. The corner cutting edges are set to an identical height, and a portion of the cutting edge which has the smallest height is located at the corner cutting edge. This ensures that a height position of the rake surface is lower than a height position of the flat surface between the corner cutting edges and the through hole. Consequently, it is possible to reduce the possibility that chips are caught in the region between the corner cutting edges and the through hole as described above.

The major cutting edge 7 is disposed on the side part of the upper surface 3. Specifically, the major cutting edge 7 is disposed between the first corner cutting edge 5a and the second corner cutting edge 5b, and is disposed closer to the second corner cutting edge 5b. The major cutting edge 7 is used as a major edge during cutting of the workpiece. The major cutting edge 7 has a straight line shape in the top view as shown in FIG. 5.

The major cutting edge 7 has the curvilinear portion 71, the first straight line portion 72, and the second straight line portion 73 in the side view. The curvilinear portion 71 has an upwardly protruding curvilinear shape. The first straight line portion 72 extends from the curvilinear portion 71 toward the connecting edge 8. The second straight line portion 73 extends from the curvilinear portion 71 toward the second corner cutting edge 5b. Therefore, the major cutting edge 7 has a top portion 7b and has a generally upwardly protruding bent shape in the side view as shown in FIG. 3.

The major cutting edge 7 does not have a generally straight line shape but an upwardly protruding bent shape in the side view. The entirety of the major cutting edge 7 is inclined relative to the workpiece. This makes it easier to contact with the workpiece than the case where the major cutting edge 7 has a straight line shape parallel to the upper surface 3. It is therefore possible to reduce cutting resistance of the major cutting edge 7, thus leading to a satisfactory machining of the workpiece.

The following description is made assuming that all of the major cutting edges 7 have the straight line shape. Strong chatter vibration occurs in the insert 1 when the major cutting edges 7 of the insert 1 start to bite into a surface of the workpiece. When all of the major cutting edges 7 simply have the straight line shape, all of the major cutting edges 7 may concurrently start to come into contact with the workpiece depending on an angle at which the major cutting edges 7 start to come into contact with the workpiece. On that occasion, a large impact is applied to the insert 1 and may cause the chatter vibration. The occurrence of the chatter vibration makes it difficult to improve cutting conditions, thus failing to improve machining efficiency.

If all of the major cutting edges 7 have the upwardly protruding curvilinear shape, the major cutting edges 7 may start to come into point-to-point contact with the workpiece. However, when the major cutting edges 7 start to bite into the workpiece, a full length of the major cutting edges 7 is longer than the case where all of the major cutting edges 7 have the straight line shape. Therefore, when all of the major cutting edges 7 have the upwardly protruding curvilinear shape, the insert 1 is continuously subjected to a strong impact for a long time.

In the insert 1 of the present embodiment, each of the major cutting edges 7 has a top portion 7b and has an upwardly protruding bent shape in the side view. Therefore, all of the major cutting edges 7 do not concurrently come into contact with the workpiece when the major cutting edges 7 start to bite into the workpiece. The full length of the major cutting edges 7 can be decreased than the case where all of the major cutting edges 7 have the upwardly protruding curvilinear shape. Hence, the insert 1 of the present embodiment is capable of reducing cutting resistance and relaxing the impact, thereby suppressing an increase in cutting resistance when the insert 1 starts to bite into the workpiece. The second straight line portion 73 is preferably longer than the first line portion 72 in the side view in order to ensure that the curvilinear portion 71 stably bites into the workpiece even when a cutting depth is relatively small.

In each of the major cutting edges 7, the curvilinear portion 71 is located closer to the second corner cutting edge 5b than the first corner cutting edge 5a, and the top portion 7p that is located uppermost is disposed closer to the second corner cutting edge 5b as shown in FIG. 3. Specifically, a distance between the top portion 7p and the first corner cutting edge 5a in a direction parallel to a virtual plane S is longer than a distance between the top portion 7p and the second corner cutting edge 5b in the direction parallel to the virtual plane S in the side view of the insert 1.

The top portion 7p lies, for example, 0.2-1.2 mm above a height position of the first corner cutting edge 5a and a height position of the second corner cutting edge 5b. A length of the major cutting edge 7 in the direction parallel to the virtual plane S is 5-25 mm, and the top portion 7p is shifted 0.5-1.5 mm toward the second corner cutting edge 5b with respect to the center axis X in the side view as shown in FIG. 3. The first straight line portion 72 extending from one end of the major cutting edge 7, which is connected to the connecting edge 8, to the curvilinear portion 71 has the straight line shape, and the second straight line portion 73 extending from the curvilinear portion 71 to the other end thereof, which is connected to the second corner cutting edge 5b, has the straight line shape. An inclination angle of the first straight line portion 72 with respect to the virtual plane S is 7-11°, and an inclination angle of the second straight line portion 73 with respect to the virtual plane S is 4-6° in the side view.

The connecting edge 8 is disposed between the flat cutting edge 6 and the major cutting edge 7 on the side part of the upper surface 3. The connecting edge 8 connects the flat cutting edge 6 and the major cutting edge 7 together. The connecting edge 8 has an outwardly protruding curvilinear shape in the top view. The connecting edge 8 having the curvilinear shape allows the flat cutting edge 6 to be approximately parallel to the machining surface of the workpiece, and also allows the major cutting edge 7 to be inclined relative to the machining surface of the workpiece. The connecting edge 8 of the present embodiment has a circular-arc shape. Although a radius of curvature of the connecting edge 8 is not particularly limited, it is set to, for example, from 0.5 mm to 4 mm.

The flat cutting edge 6 and the major cutting edge 7 respectively have the straight line shapes in the top view. Accordingly, virtual straight lines respectively along the flat cutting edge 6 and the major cutting edge 7 are set. The connecting edge 8 located between the flat cutting edge 6 and the major cutting edge 7 has the outwardly protruding curvilinear shape. Accordingly, the connecting edge 8 is located away from these virtual straight lines. That is, boundaries between a portion located on the virtual straight lines and a portion away from the virtual straight lines correspond to a boundary between the flat cutting edge 6 and the connecting edge 8, and a boundary between the major cutting edge 7 and the connecting edge 8. These contribute to clarifying a range of the connecting edge 8. The radius of curvature of the connecting edge 8 is evaluable by selecting optional three points on the connecting edge 8 in the top view, and then setting a virtual circle passing through these points.

The connecting edge 8 has the straight line shape in the side view. The flat cutting edge 6, the connecting edge 8, and the first straight line portion 72 of the major cutting edge 7 are located on a single straight line. A chip thickness generated by the flat cutting edge 6 and a chip thickness generated by the major cutting edge 7 are different from each other. Therefore, load is liable to concentrate at the connecting edge 8 connecting the flat cutting edge 6 and the major cutting edge 7. However, a change between a cutting resistance exerted on the flat cutting edge 6 and a cutting resistance exerted on the major cutting edge 7 is reducible by the fact that the flat cutting edge 6, the connecting edge 8, and the first straight line portion 72 are located on the single straight line. This makes it possible to reduce the load concentration at the connecting edge 8.

Figure 11:
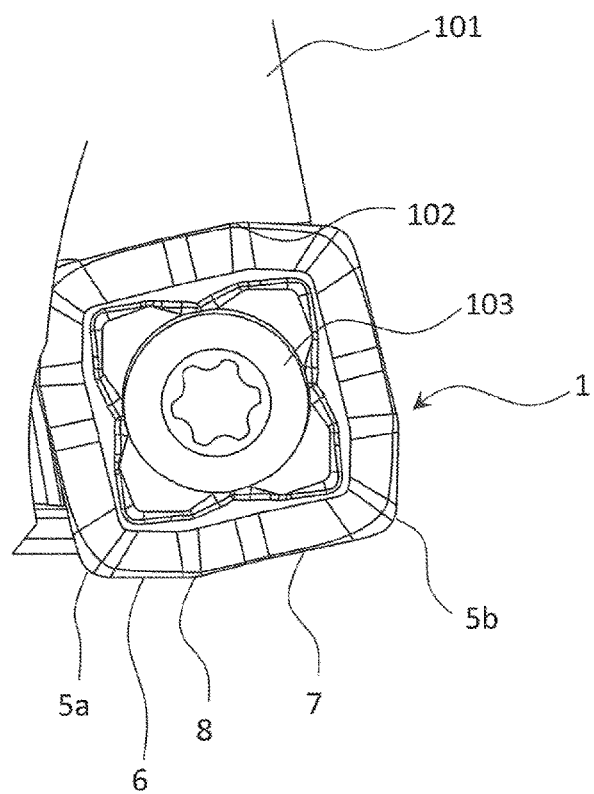
FIG. 11 is a partially enlarged side view of the cutting tool shown in FIG. 10.
Figure 12:
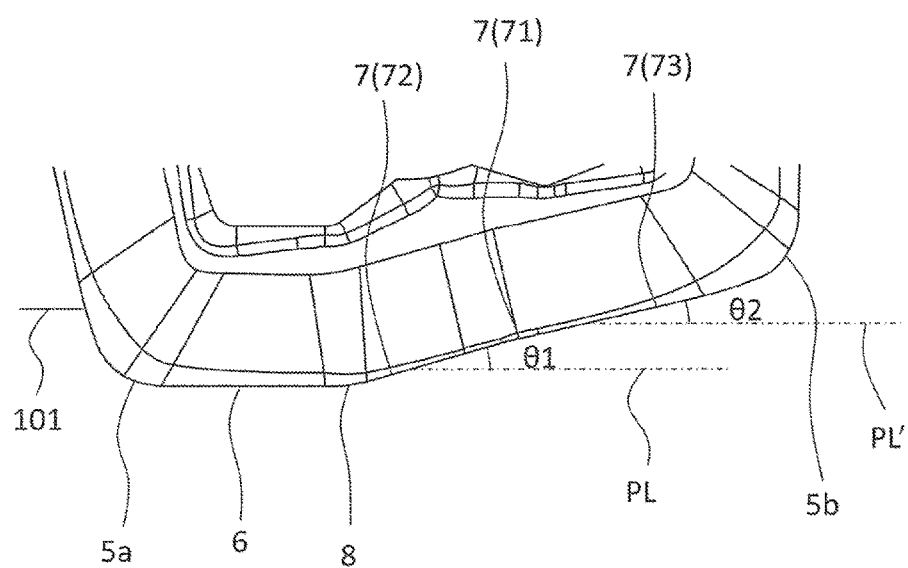
FIG. 12 is a partially further enlarged side view of the cutting tool shown in FIG. 11.

The insert 1 of the present embodiment is to be attached to the holder 101 so that the first corner cutting edge 5a, the flat cutting edge 6, the connecting edge 8, and the major cutting edge 7 project partially beyond a front end surface of the holder 101 toward the workpiece as shown in FIGS. 10 to 12. Here, the insert 1 is attached to the holder 101 so that an axial rake has a positive value. When the major cutting edge 7 starts to come into contact with the workpiece, a contact area between the workpiece and the major cutting edge 7 can be minimized owing to the top portion disposed on the major cutting edge 7. FIG. 12 shows part of FIG. 11, and parallel lines PL and PL' that are parallel to the flat cutting edge 6 are respectively indicated by alternate long and short dashed lines.

The major cutting edge 7 has the straight line shape in the top view of the insert 1. However, the axial rake has the positive value. Hence, with the insert 1 attached to the holder 101, an inclination angle of the first straight line portion 72 of the major cutting edge 7 is larger than an inclination angle of the second straight line portion 73 of the major cutting edge 7 with respect to a plane direction along the flat cutting edge 6 in the side view.

Specifically, with the insert 1 attached to the holder 101, an inclination angle of the first straight line portion 72 with respect to the parallel line PL along the flat cutting edge 6 and an inclination angle of the second straight line portion 73 of the major cutting edge 7 with respect to the parallel line PL' have different values as shown in FIG. 12. In the present embodiment, the inclination angle of the first straight line portion 72, so-called cutting edge angle θ1, is set to 14-15°. Setting is made so that the inclination angle of the second straight line portion 73, so-called cutting edge angle θ2, is 11.5-12.5°. The cutting edge angle is set to less than 20° in the insert 1 of the present embodiment. By setting the cutting edge angle to less than 20°, even when the workpiece is cut at a high feed rate, a chip thickness is small and thus makes it possible to suppress cutting resistance. Therefore, the major cutting edge 7 is less apt to generate heat, thereby reducing wear due to the heat of the major cutting edge 7.

The cutting edge angle θ1 of the first straight line portion 72 is larger than the cutting edge angle θ2 of the second straight line portion 73 in the major cutting edge 7, and it is therefore possible to reduce thrust force exerted on the holder 101. This ensures that when the cutting tool 100 cuts the workpiece, a rear edge is less liable to contact with a finished surface obtained by cutting. Consequently, the finished surface after being smoothened by the flat cutting edge 6 is less susceptible to damage.

To be specific, when both of the cutting edge angle θ1 of the first straight line portion 72 and the cutting edge angle θ2 of the second straight line portion 73 have a large value, the chip thickness generated by the second straight line portion 73 is large. The second straight line portion 73 is subjected to a large impulse of load because the second straight line portion 73 is located further away from a rotation center axis of the holder 101 than the first straight line portion 72. Reversely, when both of the cutting edge angle θ1 of the first straight line portion 72 and the cutting edge angle θ2 of the second straight line portion 73 have a small value, it is necessary to increase the length of the major cutting edge 7 in order to ensure a cutting depth. This increases the thrust force exerted on the holder 101.

The cutting edge angle θ1 is larger than the cutting edge angle θ2 in the present embodiment. Accordingly, the cutting depth is ensured at the first straight line portion 72, thereby minimizing the thrust force exerted on the holder 101. Additionally, the impulse of load exerted on the second straight line portion 73 can be minimized because the cutting edge angle θ2 is smaller than the cutting edge angle θ1. Consequently, the damage to the finished surface is suppressible by minimizing the thrust force exerted on the holder 101, while reducing a risk of fractures of the cutting edge by reducing the load exerted on the major cutting edge 7.

Here, the upper portion 4a of the side surface 4 has a first region 4a1, a second region 4a2, and a third region 4a3 as shown in FIG. 3. The first region 4a1 is a region of the upper portion 4a of the side surface 4 which is located below the first straight line portion 72. The second region 4a2 is a region of the upper portion 4a of the side surface 4 which is located below the second straight line portion 73. The third region 4a3 is a region of the upper portion 4a of the side surface 4 which is located below the curvilinear portion 71.

The present invention is not limited to the foregoing embodiment and various changes, improvements, or the like may be made therein without departing from the spirit and scope of the present invention.

<Cutting Tool>

The cutting tool 100 according to an embodiment of the present invention is described below with reference to FIGS. 9 to 12. FIGS. 9 to 12 show a state in which the insert 1 is attached to an insert pocket 102 (also hereinafter referred to simply as "pocket 102") of the holder 101 by a screw 103. A long dashed double-short dashed line in each of FIGS. 9 and 10 indicates a rotation center axis Y1 of the cutting tool 100.

As shown in FIGS. 9 to 11, the cutting tool 100 of the present embodiment has the rotation center axis Y1, and has the holder 101 having a plurality of pockets 102 on an outer peripheral surface closer to a front end thereof, and the inserts 1 to be respectively attached to the pockets 102.

The holder 101 has an approximately columnar shape whose center is positioned at the rotation center axis Y1. The holder 101 has the plurality of pockets 102 disposed at irregular intervals on the outer peripheral surface close to the front end of the holder 101. Alternatively, the plurality of pockets 102 may be disposed at regular intervals on the holder 101. The pockets 102 are configured to attach the insert 1 thereto, and open onto the outer peripheral surface and the front end surface of the holder 101. The holder 101 is not a strict columnar shape as is apparent from the fact that the holder 101 has the plurality of pockets 102.

The insert 1 is to be attached to each of the pockets 102 disposed in the holder 101. A plurality of the inserts 1 are attached so that part of the cutting edges projects forward beyond the front end of the holder 101, namely, projects beyond the front end surface of the holder 101 toward the workpiece. Specifically, the inserts 1 are attached to the holder 101 so that part of the first corner cutting edge 5a, part of the flat cutting edge 8, and part of the major cutting edge 7 project beyond the front end surface of the holder 101.

Here, the flat cutting edge 6 is fixed to a position most protruding beyond the front end surface of the holder 101. Each of the inserts 1 is attached to the pocket 102 so that the flat cutting edge 6 projects forward beyond the front end surface of the holder 101 as shown in FIG. 11. The attachment is carried out so that the flat cutting edge 6 is approximately parallel to the front end surface of the holder 101.

In the present embodiment, the insert 1 is fixed to the pocket 102 by the screw 103. That is, the insert 1 is attached to the holder 101 by inserting the screw 103 into the through hole of the insert 1, and inserting a front end of the screw 103 into a screw hole (not shown) formed in the pocket 102 so as to fix the screw 103 into the screw hole. For example, steel or cast iron is usable as a material of the holder 101. Among others, high-rigidity steel is preferably used.

<Method of Manufacturing a Machined Product>

Figure 13:
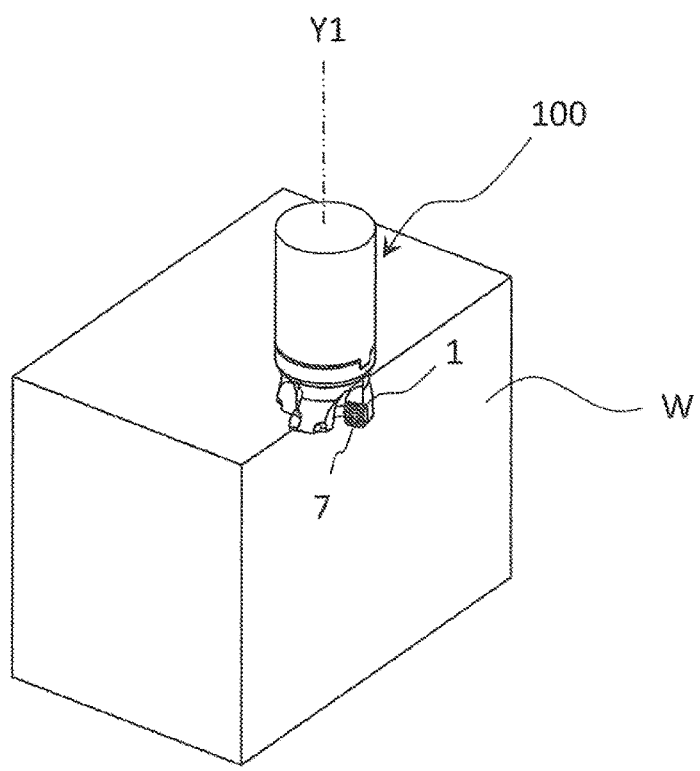
FIG. 13 is a perspective view showing a step of a method of manufacturing a machined product according to an embodiment of the present invention.
Figure 14:
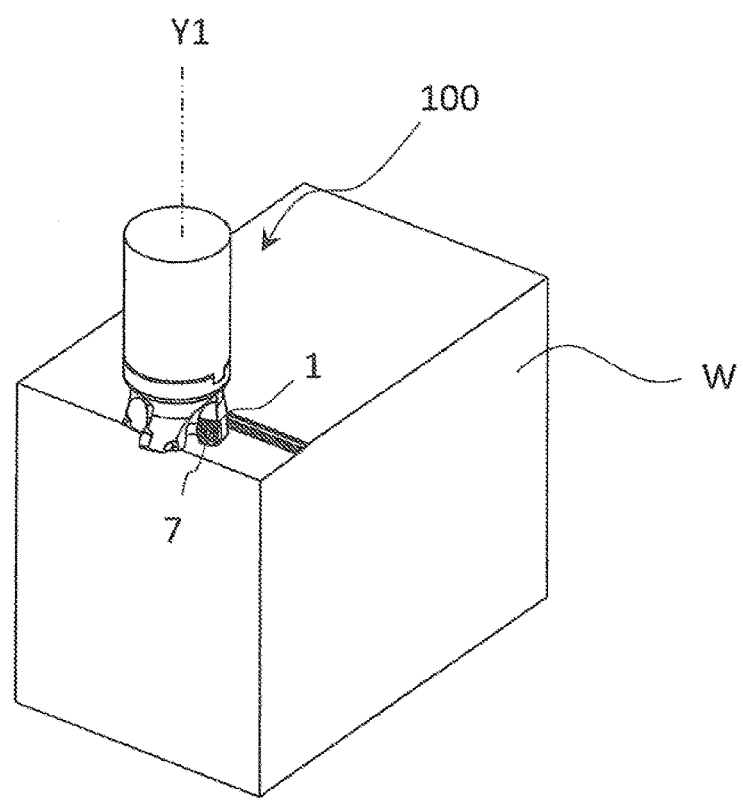
FIG. 14 is a perspective view showing a step of the method of manufacturing a machined product according to the embodiment of the present invention.
Figure 15:
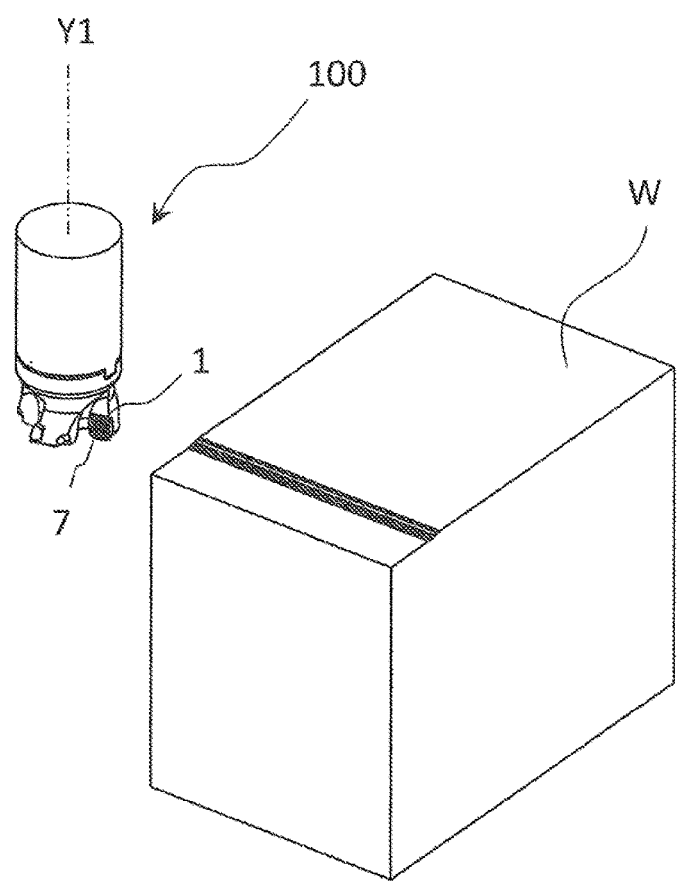
FIG. 15 is a perspective view showing a step of the method of manufacturing a machined product according to the embodiment of the present invention.

A method of manufacturing a machined product according to an embodiment of the present invention is described below with reference to FIGS. 13 to 15. FIGS. 13 to 15 show the method of manufacturing a machined product. A long dashed double-short dashed line in each of FIGS. 13 to 15 indicates the rotation center axis Y1 of the cutting tool 100. The machined product is to be manufactured by machining a workpiece. The method of manufacturing the machined product according to the present embodiment has the following steps:

(1) rotating the cutting tool 101 as typified by the foregoing embodiment;

(2) bringing the major cutting edge 7 in the cutting tool 100 being rotated into contact with the workpiece W; and (3) separating the cutting tool 100 from the workpiece W.

More specifically, the cutting tool 100 is brought relatively close to the workpiece W while being rotated around the rotation center axis Y1. Then, the workpiece W is machined by bringing the major cutting edge 7 of the cutting tool 100 into contact with the workpiece W as shown in FIGS. 13 and 14. Thereafter, the cutting tool 100 is relatively moved away from the workpiece W as shown in FIG. 15. The machined product is thus manufactured.

In the present embodiment, the workpiece W is fixed and the cutting tool 100 is brought close to the workpiece W. In FIGS. 13 and 14, the workpiece W is fixed and the cutting tool 100 is rotated around the rotation center axis Y1. In FIG. 15, the workpiece W is fixed and the cutting tool 100 is moved away from the workpiece W. Although the workpiece W is fixed and the cutting tool 100 is moved in each step of a machining process according to the production method of the present embodiment, the machining process is, of course, not limited to this embodiment.

For example, in the step (1), the workpiece W may be brought close to the cutting tool 100. In the step (3), the workpiece W may be moved away from the cutting tool 100. When the machining process is continued, it is necessary to repeat the step of bringing the major cutting edge 7 of the insert 1 into contact with different portions of the workpiece W, while the cutting tool 100 is kept rotating. When the major cutting edge 7 being used is worn, the major cutting edge 7 which is not used yet may be used by turning the cutting insert 1 90 degrees with respect to the center axis of the through hole. Representative examples of the material of the workpiece W include carbon steel, alloy steel, stainless steel, cast iron, and nonferrous metals.

DESCRIPTION OF THE REFERENCE NUMERAL 1 cutting insert (insert)
2 lower surface
3 upper surface
31 land surface
32 rake surface
33 flat surface
34 inclined surface
4 side surface
4a upper portion
4a1 first region
4a2 second region
4a3 third region
4b lower portion
41 flat portion
42 curved portion
5a first corner cutting edge
5b second corner cutting edge
6 flat cutting edge
7 major cutting edge
71 curvilinear portion
72 first straight line portion
73 second straight line portion
7p top portion
8 connecting edge
X center axis
S virtual plane
PL, PL' parallel line
H through hole
100 cutting tool
101 holder
102 insert pocket (pocket)
103 screw
Y1 rotation center axis
W workpiece

The invention claimed is:

1. A cutting insert, comprising:
an upper surface comprising a side part, and a first corner part and a second corner part each being adjacent to the side part;
a lower surface located on an opposite side of the upper surface;
a side surface located between the lower surface and the upper surface;
a first corner edge located on the first corner part;
a second corner edge located on the second corner part;
a first side edge located on the side part;
a second side edge located between the second corner edge and the first side edge on the side part; and
a third side edge located between the first side edge and the second side edge,
wherein the first side edge and the second side edge have a straight line shape, and the third side edge has an outwardly protruding curvilinear shape in a top view,
wherein the second side edge comprises an upwardly protruding curvilinear portion, and a first straight line portion extending from the curvilinear portion toward the third side edge in a side view, and
wherein the first side edge, the third side edge, and the first straight line portion are located on a straight line in the side view.

2. The cutting insert according to claim 1, wherein the curvilinear portion is located closer to the second corner edge than the first corner edge.

3. The cutting insert according to claim 1, wherein
the second side edge further comprises a second straight line portion extending from the curvilinear portion toward the second corner edge, and
the second straight line portion is longer than the first straight line portion in the side view.

4. The cutting insert according to claim 1, wherein the first side edge is inclined upward from the first corner edge to the third side edge in the side view.

5. The cutting insert according to claim 1, wherein the first corner edge and the second corner edge are closer to the lower surface than the first side edge, the second side edge and the third side edge.

6. The cutting insert according to claim 5, wherein
the upper surface further comprises
a first area located along an outer edge of the upper surface;
a second area located on an inside of the upper surface than the first area and inclined downwardly as going away from the first area; and
a third area located on an inside of the upper surface than the second area and being flat; and
the second side edge is far from the lower surface than the third area.

7. The cutting insert according to claim 6, wherein
the second corner edge is closer to the lower surface than the third area.

8. The cutting insert according to claim 1, wherein
the second corner edge has an outwardly protruding curvilinear shape and comprises
a first region having a first radius of curvature and located next to the second side edge;
a second region having a second radius of curvature and located next to the first region; and
a third region having a third radius of curvature and located next to the second region; and
the second radius is smaller than the third radius and the third radius is smaller than the first radius in the top view.

9. The cutting insert according to claim 1, wherein the third side edge has a circular-arc shape in the top view.

10. A cutting tool, comprising:
a holder having a plurality of insert pockets on a front end part of the holder; and
a cutting insert according to claim 1, which is attached to each of the insert pockets in a state in which the second side edge projects beyond the holder.

11. The cutting tool according to claim 10, wherein
the second side edge further comprises a second straight line portion extending from the curvilinear portion toward the second corner edge, and
an inclination angle of the first straight line portion of the second side edge is larger than an inclination angle of the second straight line portion of the second side edge with respect to a plane direction along the first side edge in the side view.

12. A method of manufacturing a machined product, comprising:
rotating the cutting tool according to claim 10;
bringing the second side edge of the cutting tool being rotated into contact with a workpiece; and
separating the cutting tool from the workpiece.

* * * * *